Patented Sept. 21, 1948

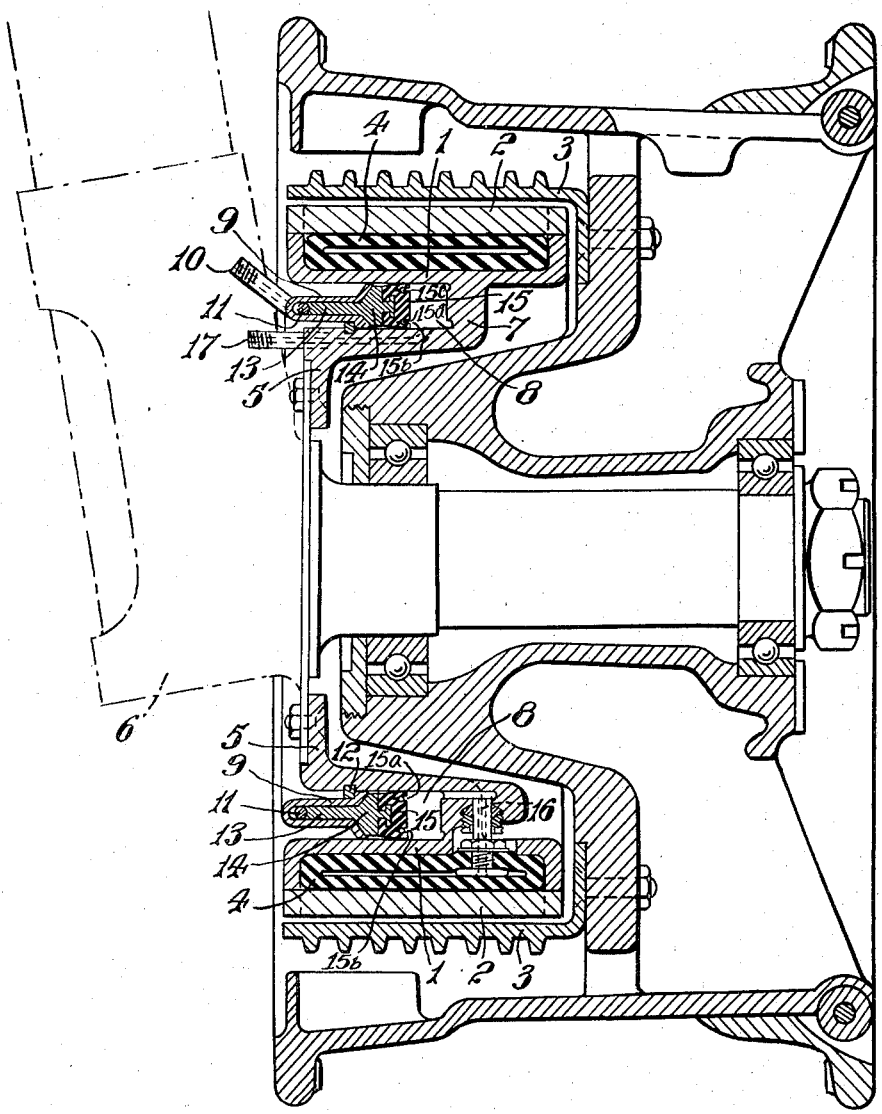

2,449,802

UNITED STATES PATENT OFFICE 2,449,802

FLUID PRESSURE OPERATED BRAKE AND THE LIKE

Henry James Butler, Beechcroft, Sutton Coldfield, England, assignor to Dunlop Rubber Company Limited, London County, England, a company of Great Britain Application May 31, 1946, Serial No. 673,380
In Great Britain June 5, 1945

6 Claims. (Cl. 188—152)

My invention relates to improvements in fluid pressure operated brakes and clutches, particularly brakes for aircraft wheels of the type having brake shoes or like friction elements movable towards a brake drum or like rotatable member relative to an annular support by an expansible or distensible member carried on said support.

The invention has for its object to provide brake and like apparatus adapted to utilise at reduced pressure a fluid medium admitted to the apparatus at a higher pressure, thereby adapting such apparatus for utilising the higher pressures now available which afford advantageous reduction in the volume and weight of fluid required, and improved response or sensitivity in operation.

According to this invention I provide brake and clutch apparatus of the type having frictional elements movable radially towards a brake drum or like rotatable member by the expansion of an expansible element relative to a support for said expansible element wherein means are provided to step down the intensity of pressure of the operating fluid medium to the actuating pressure desired in the fluid medium within said extensible element.

According to a further aspect of the invention I provide brake and clutch apparatus of the type having frictional elements movable radially towards a brake drum or like rotatable member by the expansion of an expansible element relative to a support for said expansible element which comprises an annular chamber on the said support on the side remote from said frictional elements, an outlet for the transmission of fluid medium from said chamber to said extensible element, and an annular piston in said chamber said piston being adapted to be operated by a fluid medium under pressure.

Preferably the said annular piston and annular chamber are so formed that the area of the surface of the said piston on the side of the source of fluid pressure is less than the area of the surface on the side of the fluid medium actuating said extensible element.

In order that the invention may be more easily understood and readily carried into effect the same will now be described with reference to the accompanying drawing showing a part section view of brake apparatus for a vehicle wheel, constructed in accordance with the invention.

A convenient embodiment of apparatus constructed in accordance with the invention comprises an annular support 1 of channel section, the walls of which are recessed at intervals to locate a series of frictional elements 2 movable radially of the support towards a brake drum or like rotatable member 3. Between the under surface of the shoes and the support is interposed an expansible element in the form of a flattened tube 4 distensible by air or liquid to move the shoes radially towards the brake drum. The expansible element or tube may be moulded of rubber or like material to permit expansion on the admission of fluid under pressure between such laminae.

The annular support 1 may be secured to, or be cast integrally with a centrally apertured back-plate 5 having bolt holes for the attachment of the back-plate to a flange integral with a supporting structure 6. The back-plate has a cylindrical step 7 intermediate its outer and inner peripheries which extends axially towards the supporting structure 6 to the same distance as the base of the annular support 1.

The stepped portion of the back-plate together with the base of the support 1 provides an open ended annular recess of rectangular cross section. The open end of this recess is closed to form an annular chamber 8 by the fitment of an annular closure ring 9 of narrow U-shaped section, which is disposed axially between the support and the step, the legs of the closure ring terminating in diverging flanges of which one abuts against the base of the support 1 and the other against the cylindrical surface of the step 7. The axially projecting end of the U-shaped ring is provided with an inlet union 10 for the admission of oil or other fluid medium under pressure. Within the U-shaped ring is located a sealing ring or gland 11 which may consist of a rubber ring of round or other section slidable in contact with the walls of the closure ring and also with the concave end of an annular piston 14 located in the chamber. The annular piston and the annular chamber are so formed that the area of the surface of the said piston on the side of the source of fluid pressure is less than the area of the surface of the said piston on the side of the fluid medium actuating the said extensible element whereby the desired step down in pressure is obtained. For this purpose the annular piston is formed with a part 13 of narrow section which extends into and fits slidably within the U-shaped closure ring and is integral with a head 14 of enlarged section slidable in contact with the base of the support and with the surface of the step which form respectively two of the remaining portions of the chamber 8. The U-shaped closure ring may be retained by a lock ring 12 located in a circumferential groove in the cylindrical portion or step of the back-plate.

The base of the enlarged head 14 of the annular piston is of wedge shaped section conforming to the inclination of the diverging flanges of the U-shaped closure ring, and the metal face of such head is recessed to locate thereon a sealing washer 15 of rubber or the like. The sealing washer 15 may have two axial slits 15a and 15b containing coil springs 15c and 15d respectively adapted to press the two slit marginal portions of the sealing washer against the base of the annular support and the step in the back-plate. The annular chamber 8 is provided with at least one and preferably three equally spaced fluid-tight outlet connections 16 piercing the base of the support and adapted to admit fluid under pressure from the chamber 8 to the distensible element 4.

Means may be provided to permit the entry of fluid medium from a subsidiary source of supply directly into the annular chamber 8 such means consisting of a further inlet 17 which is secured to the back-plate and is in communication with a channel in the back-plate which leads direct to that portion of the annular chamber 8 which is in communication with the distensible tube 4. This further inlet 17 facilitates initial charging and bleeding of the annular chamber 8. It also permits of the chamber being charged with additional fluid pressure medium to take up wear in the brake shoes and may be connected to a supplementary pressure supply for operating the brake for parking or emergency purposes.

Having described my invention what I claim is:

1. Brake apparatus which comprises a rotatable brake drum, a fixed support, brake shoes on said support, said brake shoes being secured against rotation and movable toward and from said brake drum, an expansible element between said support and said brake shoes, an annular fluid chamber on said support and communicating with said expansible element, said chamber having a narrow extension and a piston slidable in said chamber, said piston having a narrow extension extending into the extension of said chamber, the extension of said chamber having a fluid inlet.

2. The brake apparatus of claim 2 having a fluid inlet to said chamber.

3. Brake apparatus which comprises a rotatable brake drum, a fixed support having a channel recess opening toward said brake drum, an expansible element in said channel, brake shoes between said expansible element and said brake drum movable to and from said drum and secured in said channel against rotational movement, said fixed support having an annular channel shaped recess communicating with said expansible element, said recess having an extension of narrower width than said channel and an annular piston in said recess and having an extension extending into and fitting said extension of said recess, said piston being slidable to force fluid from said recess into said expansible element and having an inlet to said narrow extension.

4. Brake apparatus which comprises a brake drum, an annular support co-axial with said brake drum, an expansible element on said support in position to expand toward said brake drum, brake shoes on said expansible element in position to be brought into contact with said brake drum on expansion of said element, an annular chamber on said support, an annular piston in said chamber movable axially therein and separating said chamber into a delivery compartment in communication with said expansible element and a compartment to receive pressure fluid.

5. Brake apparatus which comprises a brake drum, an annular support co-axial with said brake drum, an expansible element on said support in position to expand toward said brake drum, brake shoes on said expansible element in position to be brought into contact with said brake drum on expansion of said element, an annular chamber on said support, an annular piston in said chamber movable axially therein and separating said chamber in a delivery compartment in communication with said expansible element and a compartment to receive pressure fluid, the radial dimension of said piston facing said delivery compartment being greater than the radial dimension of said piston facing said pressure fluid receiving compartment.

6. Apparatus for hydraulically reducing the rotation of one element relative to another which comprises an annular support, an annular member co-axial with and rotatable relative to said support and having an annular contact surface, an expansible member mounted annularly on said support and facing said rotatable member, friction members mounted on said expansible member to move into contact with said rotatable member upon expansion of said expansible member, an annular chamber on said support, an annular piston in said annular chamber and movable longitudinally of the axis of said annular chamber, said piston separating said chamber into a compartment communicating with said expansible member, and a compartment to receive a pressure fluid, the effective cross-sectional area of the face of said piston in said pressure fluid receiving compartment being less than the effective cross-sectional area of the face of said piston in said compartment communicating with said expansible member.

HENRY JAMES BUTLER.

REFERENCES CITED

The following references are of record in the file of this patent:

UNITED STATES PATENTS

| Number | Name | Date |
| --- | --- | --- |
| 2,219,765 | Chase | Oct. 29, 1940 |